(12) United States Patent
Slaymaker et al.

(10) Patent No.: US 9,133,783 B2
(45) Date of Patent: Sep. 15, 2015

(54) METHOD AND SYSTEM FOR ESTIMATING FUEL SYSTEM INTEGRITY

(75) Inventors: Jamie Terence Slaymaker, Lara (AU); Andrew Paul Chee Aun Wong, Kensington (AU); Adam Nolan, Glenroy (AU); Phuoc Bui Buiquang, Maribyrnong (AU); Michael Lanksch, Upwey (AU)

(73) Assignee: Ford Global Technologies, LLC, Dearborn, MI (US)

( * ) Notice: Subject to any disclaimer, the term of this patent is extended or adjusted under 35 U.S.C. 154(b) by 705 days.

(21) Appl. No.: 13/414,601

(22) Filed: Mar. 7, 2012

(65) Prior Publication Data

US 2013/0238226 A1    Sep. 12, 2013

(51) Int. Cl.
| | |
|---|---|
| F02D 41/02 | (2006.01) |
| F02D 41/06 | (2006.01) |
| F02D 41/22 | (2006.01) |
| F02D 41/00 | (2006.01) |
| F02D 19/02 | (2006.01) |
| F02D 41/04 | (2006.01) |

(52) U.S. Cl.
CPC ............ *F02D 41/065* (2013.01); *F02D 19/025* (2013.01); *F02D 41/0027* (2013.01); *F02D 41/221* (2013.01); *F02D 41/042* (2013.01); *F02D 2041/225* (2013.01); *F02D 2200/0602* (2013.01); *Y02T 10/32* (2013.01); *Y02T 10/40* (2013.01)

(58) Field of Classification Search
CPC ............ F02D 2041/225; F02D 19/021; F02D 19/025; F02D 33/003
USPC ............... 701/104, 112, 113, 114, 33.6, 33.8, 701/33.9; 123/179.9, 179.12, 463–465, 123/527, 529, 198 D, 198 DB, 458, 494
See application file for complete search history.

(56) References Cited

U.S. PATENT DOCUMENTS

| | | | |
|---|---|---|---|
| 5,033,444 A | 7/1991 | Kaufman et al. |
| 5,697,346 A | 12/1997 | Beck |
| 5,887,574 A | 3/1999 | Smith |
| 5,902,346 A | 5/1999 | Cullen et al. |
| 6,109,244 A | 8/2000 | Yamamoto et al. |
| 6,155,235 A | 12/2000 | Kilgore |

(Continued)

FOREIGN PATENT DOCUMENTS

| | | |
|---|---|---|
| AU | 2010200354 A1 | 8/2011 |
| EP | 0828070 A2 | 3/1998 |

(Continued)

OTHER PUBLICATIONS

Nolan, Adam et al., "Method and System for Estimating Fuel Composition," U.S. Appl. No. 13/414,620, filed Mar. 7, 2012, 47 pages.

*Primary Examiner* — Hieu T Vo
*Assistant Examiner* — Sherman Manley
(74) *Attorney, Agent, or Firm* — Julia Voutyras; Alleman Hall McCoy Russell & Tuttle LLP

(57) ABSTRACT

Methods and systems are provided for operating a fuel system configured to deliver a gaseous fuel to an engine. While the engine is shutdown, diagnostic routines may be performed to identify fuel system leaks or breaches. When the engine is subsequently restarted, fuel rail pre-priming is adjusted based on the presence of fuel system leaks.

18 Claims, 7 Drawing Sheets

(56) References Cited

U.S. PATENT DOCUMENTS

| | | | |
|---|---|---|---|
| 6,390,075 B1 * | 5/2002 | Yamazaki et al. | 123/529 |
| 6,766,269 B2 | 7/2004 | Lee | |
| 6,830,026 B2 * | 12/2004 | Agricola et al. | 123/198 D |
| 7,318,414 B2 | 1/2008 | Hou | |
| 7,970,528 B2 * | 6/2011 | Janarthanam et al. | 701/114 |
| 2003/0216883 A1 | 11/2003 | Lee | |
| 2005/0034710 A1 | 2/2005 | Crary et al. | |
| 2005/0049777 A1 | 3/2005 | Fritsch et al. | |
| 2006/0231078 A1 | 10/2006 | Barylski et al. | |
| 2009/0120413 A1 | 5/2009 | Ramamurthy et al. | |
| 2009/0221868 A1 | 9/2009 | Evans | |
| 2009/0250038 A1 * | 10/2009 | Xu et al. | 123/457 |
| 2010/0095935 A1 * | 4/2010 | Verner et al. | 123/456 |
| 2011/0186012 A1 * | 8/2011 | Wong et al. | 123/445 |
| 2013/0238226 A1 * | 9/2013 | Slaymaker et al. | 701/113 |
| 2014/0067242 A1 * | 3/2014 | Kwapis et al. | 701/113 |

FOREIGN PATENT DOCUMENTS

| | | |
|---|---|---|
| GB | 2116254 A | 9/1983 |
| JP | 59018261 A | 1/1984 |
| WO | 2005021952 A1 | 3/2005 |
| WO | 2008007128 A1 | 1/2008 |

* cited by examiner

METHOD AND SYSTEM FOR ESTIMATING FUEL SYSTEM INTEGRITY

FIELD

The present application relates to accurately estimate the integrity of a fuel system in a vehicle using liquefied petroleum gas.

BACKGROUND/SUMMARY

Alternate fuels have been developed to mitigate the rising prices of conventional fuels and for reducing exhaust emissions. For example, natural gas has been recognized as attractive alternative fuels. For automotive applications, natural gas or petroleum gas may be compressed and stored as a liquid (liquefied petroleum gas, or LPG) in cylinders at saturation or higher pressure. The fuel system in such automotive applications may include various components, such as valves and pressure regulators, to ensure correct flow of the fuel, and enable the gaseous fuel to be provided at lower pressures to an engine combustion chamber. In some vehicle systems, the fuel line may be charged with liquid fuel tank pressure before an engine start is initiated. For example, such a "pre-priming" process may be initiated when the driver's door is opened ("door ajar pre-prime") so that the priming is completed before the driver turns the ignition on. As such, this allows engine start times to be reduced.

However the inventors herein have identified potential issues with such systems. As one example, if there is a leak or breach in the fuel system, the driver may not be able to terminate the pre-priming operation. Specifically, in fuel systems where the priming is initiated after the ignition is turned on, the driver may turn off the ignition, and consequently the priming, if a leak is detected. However, in systems where the pre-priming is automatically initiated, the process may not be terminated until it has run the course. As such, this may lead to degraded engine performance during the subsequent restart due to improper priming.

Thus, in one example, some of the above issues may be addressed by a method for an engine operating on a gaseous fuel comprising, indicating fuel system degradation based on a change in each of a fuel rail pressure and a fuel tank pressure over a duration while the engine is shutdown. In response to the indication, the method further includes disabling pre-priming on a subsequent engine restart. In this way, sufficient pre-priming may be better enabled.

In one example, an engine may be operated with a gaseous fuel, such as LPG, which is delivered to the engine from a dedicated fuel system. During an engine shutdown condition, an electronic controller of the engine system may be temporarily enabled or "woken up" to perform one or more leak detection routines. The diagnostic routines may be performed to identify the presence of gross leaks as well as small leaks in the fuel system. For example, the controller may be enabled for a first, shorter duration while the engine is shutdown and a change in fuel tank pressure and fuel rail pressure may be monitored. If a pressure differential between the fuel rail pressure and the fuel tank pressure is lower than a threshold after the short duration, a gross leak in the fuel system may be determined. The controller may also be enabled for a second, longer duration while the engine is shutdown and a change in fuel rail pressure may be monitored. If the fuel rail pressure decreases towards barometric pressure, a small leak in the fuel system may be determined.

If no fuel system degradation is determined, then a pre-priming operation may be enabled on a subsequent engine restart. Therein, in response to a vehicle operator door being opened, and in anticipation of an imminent engine restart request, a fuel pump may be operated to prime the fuel rail. In comparison, if fuel system degradation is identified, the pre-priming operation may be disabled. Therein, the fuel rail may be primed only after a request for engine restart is received from the operator. Additionally, the priming may be performed for a longer duration in the absence of accurate fuel rail pressure data to preclude insufficient fuel rail priming.

It will be appreciated that the gaseous fuel referred to herein is a fuel that is gaseous at atmosphere conditions but may be in liquid form while at high pressure (specifically, above saturation pressure) in the fuel system. That is, the fuel may be in liquid form until it is injected.

In this way, engine startability may be improved when operating with a gaseous fuel, even in the presence of fuel system leaks. By disabling pre-priming in response to the presence of a fuel system leak, issues related to insufficient fuel rail priming may be reduced. In addition, by enabling leak detection to be performed during engine shutdown conditions, a more accurate indication of fuel system degradation may be attained. Overall, engine performance may be improved.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
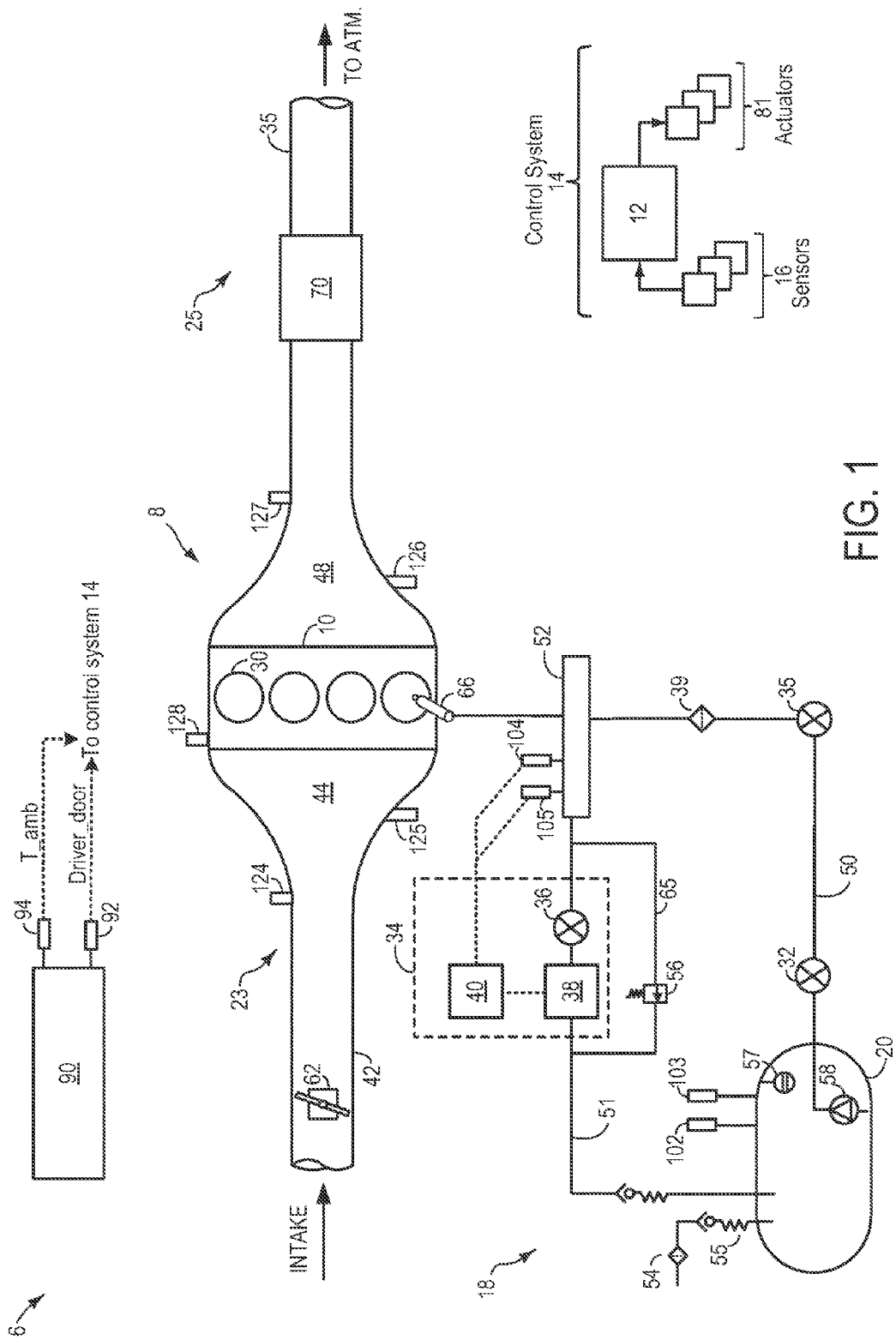
FIG. 1 shows a schematic depiction of an engine system configured to operate on a gaseous fuel.

Methods and systems are provided for operating a mono- or multi-fuel engine system using a gaseous fuel, such as the system of FIG. 1. A controller may be configured to transition between engine running and engine shutdown conditions and perform one or more diagnostic routines based on the engine state (FIGS. 2-3) to identify the presence of leaks in the fuel system. For example, the controller may be configured to perform engine-off diagnostic routines, such as the routines of FIGS. 4-5, to identify gross or small leaks in the fuel system. Likewise, the controller may perform an engine-running diagnostic routine, such as the routine of FIG. 6. Based on the indication of degradation, a pre-priming operation on a subsequent engine restart may be adjusted. An example adjustment to a pre-priming operation is shown at FIG. 7. By disabling pre-priming in response to a fuel system leak, engine stalls due to insufficient fuel rail priming may be reduced.

FIG. 1 shows a schematic depiction of a vehicle system 6. The vehicle system 6 includes an engine system 8, a control system 14, and a fuel system 18. The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere upon passage through an emission control device 70. It will be appreciated that other components may be included in the engine such as a variety of valves and sensors. Fuel system 18 may include one or more fuel tanks. In the depicted example, the fuel system is a mono-fuel system including fuel tank 20 configured to store a gaseous fuel and deliver the fuel to engine 10 via fuel supply line 50 and fuel rail 52. As used herein, the gaseous fuel refers to a fuel that is gaseous at atmospheric condition but which may be stored and delivered to the engine in liquid form (at a pressure above saturation pressure, as elaborated below). The fuel system 18 further includes a fuel recovery line 51 between fuel tank 20 and the injectors 66 of fuel rail 52 so that unused fuel can be recovered. The gaseous fuel may be stored in fuel tank 20 at saturation pressure. Further, when fuel system 18 is configured as a liquid phase injection (LPI) system, as depicted in the given example, the gaseous fuel is delivered to the fuel rail at an elevated pressure. In one example, the gaseous fuel may be compressed natural gas fuel (CNG fuel) or liquefied petroleum gas fuel (LPG fuel). Herein, in the liquid phase injection system example, when stored at saturation pressure, and while delivered along the fuel line and fuel rail at high pressure, the fuel may be in liquid form. However, when injected into the engine via the injectors into the combustion chamber at lower pressure (e.g., into a lower pressure fuel preparation are engine), the fuel may transition into a gaseous form (e.g., vaporize). By maintaining the fuel at higher pressure and in liquid form during delivery along the fuel line and into the fuel rail, metering of the gaseous fuel may be facilitated. Various fuel system components, such as various valves, pressure regulators, filters, and sensors, may be coupled along fuel supply and recovery lines 50 and 51, as described below.

While fuel system 18 is depicted herein as a mono-fuel system, in alternate embodiments, fuel system 18 may be a multi-fuel system including one or more additional fuel tanks for delivering other fuels having different chemical and physical properties to the engine along dedicated fuel lines (not shown). For example, the gaseous fuel in fuel tank 20 may be a first fuel (e.g., LPG fuel) and the fuel system may include a second liquid fuel (e.g., gasoline, fuels with a range of alcohol concentrations, various gasoline-ethanol fuel blends such as E10 and E85, and combinations thereof). As used herein, the liquid fuel refers to a fuel that is liquid at atmospheric conditions, and that may be stored in a fuel tank and delivered along a fuel rail as a liquid under atmospheric conditions.

In one example, where the gaseous fuel is an LPG fuel, the composition of the fuel may vary. For example, the composition may vary based on the source of the fuel (e.g., country of origin, country of use, etc.) as well as the specific application of the fuel. For example, in Australia, LPG fuel includes 5 main constituents, namely, propane, propene, n-butane, i-butane and butenes. Differing LPG fuels may have differing ratios of the various constituents. Since the composition of the fuel affects various physical and chemical properties of the fuel (e.g., fuel density, saturation pressure, octane rating, etc.), which in turn affects engine operations (e.g., fuel injection amount and timing, knock suppression, etc.), accurate fuel composition estimation is required when using LPG as an automotive fuel. LPG fuel compositions may be estimated or inferred based on fuel tank pressure and temperature data. As such, the fuel tank data enables estimation of only two components. Thus, for purposes of composition estimation, the propane and propene constituents of the LPG fuel are grouped together (collectively called "propane") while the n-butane and i-butane constituents of the LPG fuel are grouped together (collectively called "butane"). The percentage of butenes in LPG fuels may be relatively low, and may be considered insignificant for purposes of composition estimation. Example LPG compositions in Australia may include a range of propane to butane ratios varying from 40/60 to 100/0 (propane/butane). As elaborated herein, one example method of composition estimation may include following a fuel tank refill event and/or when selected sampling conditions are met, updating the estimated fuel composition. Engine operations may then be adjusted based on the updated fuel composition estimate. If the operating conditions do not permit an accurate fuel composition update (e.g., the selected sampling conditions are not met), engine operations may be adjusted based on an un-updated (or most recent) fuel composition estimate. Also, the engine operations may be adjusted (e.g., with a correction factor) to compensate for the lack of a most recent fuel composition estimate.

Fuel may be delivered from fuel tank 20 to the injectors of engine 10, such as example injector 66, via fuel rail 52. While only a single injector 66 is depicted, additional injectors are provided for each cylinder 30. In one example, where fuel system 18 includes a direct injection system, injector 66 may be configured as a direct fuel injector. In an alternate embodiment, fuel system 18 may include a port injection system wherein injector 66 may be configured as a port fuel injector. In still other embodiments, each cylinder may include one or more injectors including a direct injector and a port injector.

Fuel tank 20 may be refilled with gaseous fuel via fueling port 54 which may include a filter for filtering the fuel (e.g., a compressed, liquid version of the gaseous fuel) prior to storage. The fueling port may also be coupled to a check valve 55 to ensure correct flow of fuel from fueling port 54 into fuel tank 20. A fuel level sensor 57 (herein also referred to as a fuel level sender) coupled to fuel tank 20 may provide an indication of a fuel liquid level in the tank to control system 14. In one example, fuel level sensor 57 may comprise a float connected to a variable resistor. Alternatively, other types of fuel level sensors may be used. A fuel tank pressure sensor or pressure transducer 102 may also be coupled to fuel tank 20 to provide an estimate of a fuel tank pressure to control system 14. Likewise, a fuel tank temperature sensor 103 may be coupled to fuel tank 20 to provide an estimate of a fuel tank temperature to control system 14. While fuel tank pressure sensor 102 and temperature sensor 103 are shown coupled to fuel tank 20, they may alternatively be coupled to fuel supply line 50. Optionally, additional pressure and temperature sensors may be coupled to fuel recovery line 51.

Fuel tank 20 may include a fuel pump 58 (or fuel pump module) for pumping fuel at higher pressure into fuel line 50. In one example, fuel pump 58 may be a one-way variable displacement pump. In some embodiments, the fuel pump may be further coupled to a pressure regulator 34 to enable pressure control. For example, the fuel pump may be configured to raise the pressure of fuel pumped from the fuel tank and a pressure regulator 34 may be sized to regulate the fuel rail pressure to 5 bar above tank pressure. In some embodiments, the fuel pump 58 may also be coupled to a check valve to ensure correct flow of fuel from the fuel tank into the fuel line.

Fuel may be delivered by fuel pump 58 into fuel line 50 via a tank shut-off valve 32 and a fuel rail shut-off valve 35 and a pressure regulator 34. The opening and shutting of tank shut-off valve 32 may control entry of fuel from fuel tank 20 into fuel supply line 50 while the opening and shutting of fuel rail shut-off valve 35 may control entry of fuel into fuel rail 52. In one example, one or more of tank shut-off valve and rail shut-off valve may be an on-off solenoid valve that is opened in response to a vehicle operator indicating that they wish to operate the engine with the gaseous fuel. A pressure regulator 34 is positioned downstream from fuel tank 20 and fuel rail 52 to regulate a fuel rail pressure (FRP) between the fuel rail and the injector 66 at a specified pressure above tank pressure, such as at 5 bar above tank pressure. If fuel rail pressure rises above the specified pressure, the regulator 34 allows communication back to the fuel tank through the fuel recovery line 51 in order to reduce the fuel rail pressure. If fuel rail pressure is below the specified pressure, the regulator 34 blocks communication with the fuel recovery line 51. As elaborated below, an additional by-pass return line 65 is provided with a pressure relief valve 56 (or bypass solenoid valve) that also selectively allows communication between the fuel rail and the fuel tank via the fuel recovery line 51. In one example, pressure regulator 34 may be an electronic pressure regulator including a mechanical pressure regulator 38, a fuel rail valve 36, and an electronic feedback component 40.

It will be appreciated that in some embodiments, rather than a pressure regulator and a bypass solenoid, an alternative approach may include a high pressure variable flow solenoid valve wherein the solenoid valve is adjusted to regulator pressure to a desired rail pressure after engine start-up and before engine shutdown.

Fuel rail valve 36 may be a duty-controlled solenoid valve. As such, since tank and rail shut-off valves are located on the higher pressure side of pressure regulator 34, the fuel rail and fuel tank shut-off solenoid valves may be referred to as high pressure solenoid valves, while the fuel rail valve 36 positioned downstream of the regulator, in recovery line 51, may be referred to as a low pressure solenoid valve. A filter 39 may also be positioned on the high pressure side of fuel supply line 50. Electronic feedback component 40 may receive input regarding the current fuel rail pressure from fuel rail pressure sensor 104, and accordingly adjust the duty cycle of fuel rail valve 36 to thereby adjust the valve's opening. Electronic feedback component 40 may also adjust the duty cycle of fuel rail valve 36 based on input regarding the current fuel rail temperature received from fuel rail temperature sensor 105.

In one example, fuel tank 20 may store the gaseous fuel in a pressure range of 10-700 bar (e.g., 0-100+ psi for LNG fuel, 500 psi for ANG fuel, 3000-6000 psi, or 250 bar, for CNG fuel, 1.80-25.5 bar for LPG fuel, and 5000-10,000 psi for hydrogen fuel) while pressure regulator 34 may regulate the fuel rail pressure to a fixed range of 10-40 bar (e.g., 2-10 bar for CNG fuel and 5 bar (as referenced with respect to the recovery line 51 and hence also the fuel tank pressure) for LPG fuel). Herein, the mechanical regulator may regulate the fuel line pressure to 5 bar while the duty-controlled solenoid valve may further regulate the pressure to between 5 and 10 bar. While the above example suggests regulating to 5 bar above tank pressure, in alternate embodiments, the pressure may be regulated to within 2-10 bar above tank pressure.

It will be appreciated that while the depicted embodiment shows pressure regulator 34 as an electronic regulator, in alternate embodiments, pressure regulation may be performed via only mechanical pressure regulator 38 wherein fuel rail valve 36 may be configured as a simpler on/off solenoid valve with no electronic feedback. However, by including electronic feedback input, pressure regulation may be achieved in the electronic regulator embodiment via the use of a smaller (e.g., relatively less accurate) mechanical regulator.

Fuel system 18 may further include a pressure relief valve (or solenoid) 56 in bypass line 65 for enabling pressure relief. Specifically, closed pressure relief valve 56 may be selectively opened in response to elevated fuel rail pressures to reduce the fuel rail pressure at fuel rail 52 to approximately a tank pressure value. As one example, where pressure regulator 34 is configured to regulate the pressure of the gaseous fuel to 5 bar, pressure relief valve 56 may be opened in response to a fuel rail over pressure condition. By venting fuel during elevated fuel rail pressures, component damage from prolonged exposure to elevated fuel rail pressures can be reduced. In addition, pressure relief valve 56 may enable the pressure regulator 34 to be bypassed so as to assist with fuel system priming. For example, pressure relief valve 56 may be opened at pressures below a specified venting pressure of the pressure regulator to enable increased fuel boiling during/after an engine shutdown to rapidly remove heat from the injectors and the fuel rail and better cool the fuel system. For example, after an engine shutdown, the pressure relief valve may be open (allowing communication from the fuel rail back to the fuel tank) to advantageously cool utilize the latent heat of vaporization of the fuel to cool the fuel rail, and then once the fuel is cooled below a threshold temperature, the pressure relief valve may be closed to build rail pressure to enable more fuel to be in a liquid state in the rail, even at elevated fuel temperatures. The opening the of pressure relief valve may further enable improved vapor purging during the engine start.

Gaseous fuels such as LPG may be affected by changes in pressure and temperature. For example, when stored or delivered in liquid form, the liquid fuel in the fuel line may vaporize under the influence of heat, pressure and temperature. The vaporization effect may also vary based on the composition of the LPG fuel. In a Liquid Phase Injection (LPi) system (as depicted in FIG. 1), the injected mass is metered as a liquid. Vapor in the fuel lines can significantly displace the liquid, and degrade engine restarts due to potentially incorrect fueling. As the vapor to liquid volume ratio of LPG is approximately 270:1, the vapor in the fuel line and rail must be purged prior to starting the engine to ensure an accurate injected fuel mass and hence start quality. To improve engine restart times and start quality, in response to a request for engine operation on gaseous fuel in liquid phase, the fuel pump and solenoid valves may be operated to prime the fuel rail. Herein, the fuel pump may increase the pressure in the fuel rail so that a liquid fuel may be sustained at the elevated fuel rail temperature.

In some engine systems, further improvements in restart times may be achieved by pre-priming the fuel rail. Therein, even before an engine operation request is received from the vehicle operator, and before the engine in cranked, the fuel pump is operated to prime the fuel rail. For example, with reference to the vehicle system of FIG. 1, vehicle system 6 may include one or more doors, including a driver door 90 via which the driver may enter a cabin of the vehicle. The driver door may be further coupled to a door sensor 92 to provide an indication regarding the status of the driver door ("driver_door"). In response to the driver door being opened (or left ajar), a "driver door ajar" indication may be provided by door sensor 92 to the control system 14. In response to the received "driver door ajar" indication, the control system may selectively initiate fuel pump and solenoid operation so that by the time the driver is in the cabin and has requested engine operation, the fuel system is already primed with the gaseous fuel in liquid phase and the engine is ready to be cranked and restarted. Herein, in anticipation of an imminent engine restart request (based on the driver door being opened), the fuel pump is started to purge the fuel system of vapor and return it to the tank even before the vehicle operator has turned on an ignition key, or pressed an engine start button. As a result, the fuel rail may have sufficient liquid fuel by the time the operator requests the engine start. As an example, pre-priming operations may reduce engine restart times by 8 seconds.

While FIG. 1 shows a door sensor coupled to the driver door, it will be appreciated that alternate driver sensors may be used. For example, a driver sensor in or for a vehicle seat may be used. The sensor may be coupled to an active seat restraint system that determines whether a driver or occupant is present in the driver's seat. Alternatively, the sensor may be a seat sensor. Still other sensors may be used. Irrespective of the nature of the driver sensor, the vehicle control system 14 may utilize the indication from the driver sensor to activate fuel priming (o pre-priming) to ensure that the engine is ready to start when the driver is in the car. This also helps to reduce indiscriminate priming that would otherwise unnecessarily increase vehicle electrical loads and drive the requirement for a larger battery and alternator.

The priming (or pre-priming) operations may be adjusted based on the estimated fuel composition (e.g., the ratio of propane to butane, etc.) so as to compensate for the vaporization effect of the fuel. Likewise, the priming operations may also be adjusted based on ambient conditions, such as an ambient temperature, humidity, or barometric pressure. In one example, appropriate temperature, pressure, and/or humidity sensors may be coupled to the vehicle system at a location in communication with ambient air (e.g., outside the vehicle, vehicle air intake system, etc.). As one example, vehicle system 6 is shown including a temperature sensor 94 for providing an estimate of an ambient temperature (T_amb) to control system 14.

As such, if there is a leak or breach in the fuel system, insufficient fuel rail priming may occur. Specifically, the automatically initiated pre-priming operation may be completed without the fuel rail pressure being sufficiently maintained to hold the fuel in a liquid state. In addition, in the presence of a fuel system leak, the estimated fuel rail pressure may not be highly reliable. Insufficient fuel rail priming may lead to degraded engine performance and even engine stalls during a subsequent engine restart. To reduce issues related to insufficient priming, an engine controller (such as a powertrain control module of the control system) may be intermittently awoken or enabled during engine shutdown conditions to monitor fuel tank and fuel rail conditions and determine if there is a leak or breach in the fuel system. As elaborated herein with reference to FIGS. 3-6, the controller may be awoken to monitor changes in fuel tank pressure and fuel rail pressure over a short duration while the engine is shutdown, and identify gross leaks in the fuel system based on a pressure differential (e.g., absolute pressure difference or pressure ratio) over the short duration. The controller may also be awoken to monitor changes in fuel tank pressure and fuel rail pressure over a long duration while the engine is shutdown, and identify small leaks in the fuel system based on a pressure differential (e.g., absolute pressure difference or pressure ratio) over the short duration. Further still, the controller may monitor changes in fuel tank pressure and fuel rail pressure over a duration while the engine is running to identify fuel system leaks. If a leak is detected, the controller may disable the pre-priming. Specifically, the controller may initiate priming only after receiving an engine restart request from the vehicle operator. To further enable sufficient fuel rail pressures and fuel phase state to be attained, the controller may extend a duration of the priming in response to the indication of fuel system degradation.

In this way, complete priming may be better enabled and engine startability even in the presence of a fuel system leak can be improved. As such, since the engine-off diagnostics are performed when the system fuel rail pressure is isolated from the tank while the engine is "off", no fuel can flow out of the tank to the fuel rail. Thus, even a small leakage of gas from the fuel lines and fuel rail can have a substantially greater effect on the pressure, making the diagnosis of a "leak" more accurate and reliable. Conversely, when the engine is running, the system is always being replenished with fuel because the pump is running and the valves are open. During such conditions, it may be very difficult to detect a small leak. As a result, the accuracy and reliability of diagnostics performed while the engine is running (that is, engine-on diagnostics) may be reduced.

As illustrated herein, engine running diagnostics may be performed in addition to engine-off diagnostics for further substantiation of test results. For example, the engine running integrity test elaborated herein at FIG. 6 (Test_3) may provide an indication of a condition of an internal valving, pump or regulator issue that would make the results of the engine-off integrity tests (that is, Test_1 and Test_2, elaborated at FIGS. 4-5) invalid. Thus, this test may also disable the key-off door ajar priming (or "pre-priming") operation.

Control system 14 is shown receiving information from a plurality of sensors 16 (various examples of which are described herein) and sending control signals to a plurality of actuators 81 (various examples of which are described herein). As one example, sensors 16 may include MAP and MAF sensors 124 and 125 in the intake, exhaust gas sensor 126, temperature sensor 127 located in the exhaust, ambient air temperature sensor 94, fuel tank and fuel rail temperature sensors 103 and 105 respectively, fuel tank and fuel rail pressure sensors 102 and 104 respectively, door sensor 92, fuel level sensor 57, etc. Other sensors such as pressure, temperature, fuel level, air/fuel ratio, and composition sensors may be coupled to various locations in the vehicle system 6. As another example, the actuators may include fuel pump 58, fuel injector 66, solenoid valves 32 and 36, pressure regulator 34, and throttle 62. The control system 14 may include a controller 12. The controller may receive input data from the various sensors, process the input data, and trigger the actuators in response to the processed input data based on instruction or code programmed therein corresponding to one or more routines. Example control routines are described herein with regard to FIGS. 3-6.

Figure 2:
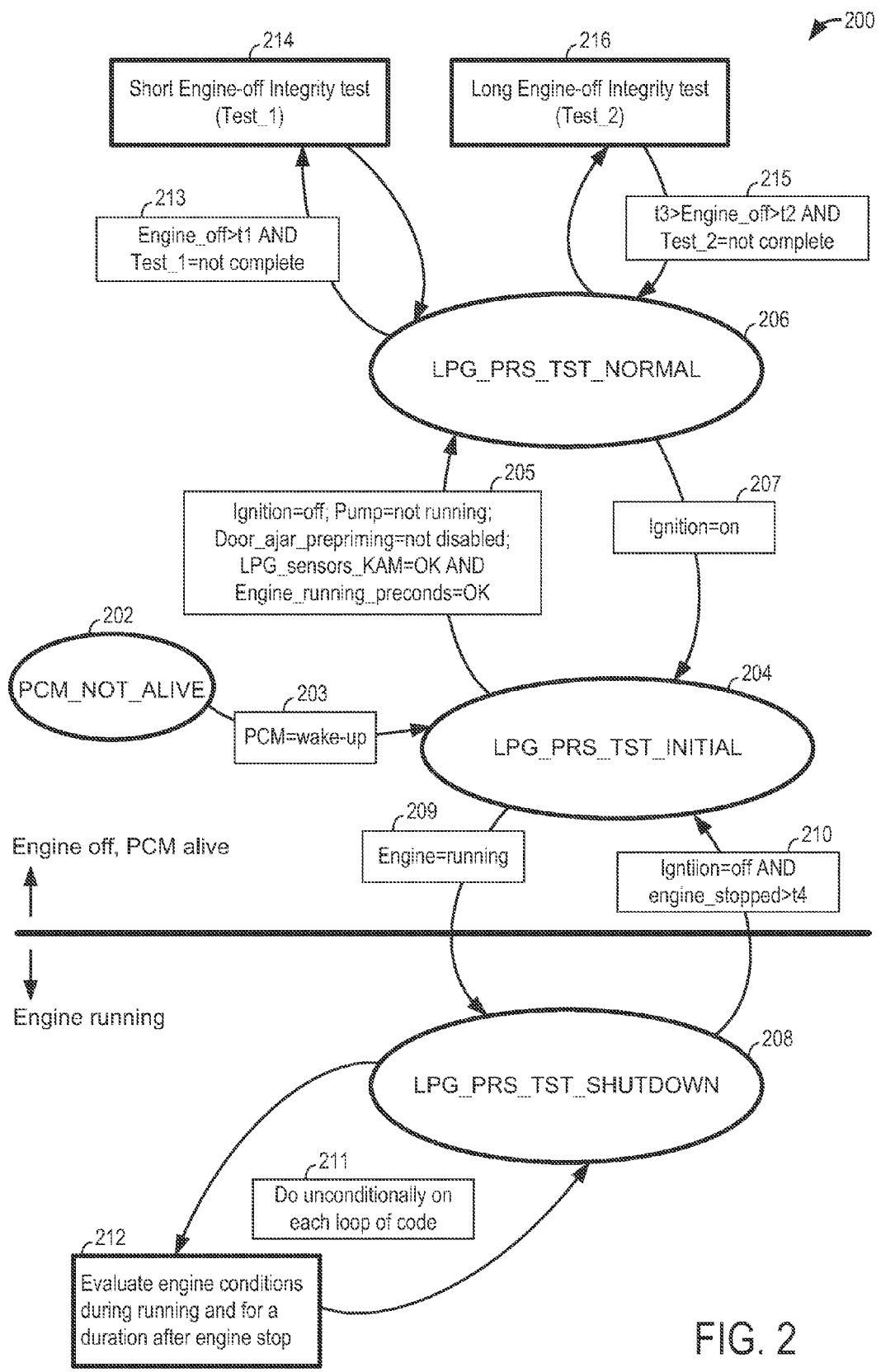
FIG. 2 shows an example state flow diagram for transitioning between different states of operation of the engine system of FIG. 1.

Now turning to FIG. 2, an example state flow diagram 200 is shown for identifying different states of operation of the engine system of FIG. 1, and for transitioning between them. As an example, state diagram 200 may be used as part of a routine, such as the routine of FIG. 3, to determine which diagnostics routine to select and when to initiate the routine.

State diagram 200 reflects different operational states of the engine system. The different operational states may correspond to operational states when the engine is off or when the engine is running. Additionally, during the various states, an engine controller (e.g., a powertrain control module, PCM) may be enabled (herein also referred to as "alive" or "awake"), or disabled (herein also referred to as "asleep").

A first operation state (PCM_NOT_ALIVE) is depicted at 202. During this state, the engine may be switched off (or powered off) and the controller (PCM) may be disabled (not alive). In response to a PCM wake up signal 203, the engine state may be transitioned to a initial testing state 204 (LPG_PRS_TST_INITIAL). In one example, the controller may be awoken after a defined duration since an engine has been shutdown. For example, the controller may be awoken after 6 mins since a shutdown. In an alternate example, the controller may be awoken and maintained enabled for a selected duration after the engine shutdown. For example, the controller may be awoken and maintained enabled (or powered on) for 15 mins after the shutdown. In yet another example, the controller may be woken up by an event such as a "door open" event. In initial state 204, the engine system may be initialized upon waking up the PCM. The various system state variables may then be read from the controller's KAM (Keep Alive Memory).

The system may transition from initial state 204 to a normal testing state 206 (LPG_PRS_TST_NORMAL) if selected entry conditions 205 are met. The normal testing state 204 may correspond to a state where the ignition switch is not turned on but the PCM is alive. In this state, the system decides whether the various leak detection tests will be run, and if so, when they will be run. The entry conditions 205 for entering the normal testing state 204 include each of the ignition being off, the fuel pump not currently running, the door ajar pre-priming operation being enabled (or not disabled), all the primary fuel sensors (e.g., fuel tank temperature sensor, pressure sensor, fuel level sensor, etc.) being functional, and engine running preconditions being met. The engine running preconditions may have been previously monitored and stored in the controller while engine system was in testing shutdown state 208 (described below). To verify that the engine running conditions have been met, the KAM may be accessed to determine if a flag indicating that "engine running conditions have been met" was set while in testing shutdown state 208.

From the normal testing state 204, the system may transition to performing one or more fuel system integrity tests wherein fuel system leaks are detected. These may include a first Short engine-off integrity test 214 (Test_1) and a second Long engine-off integrity test 216 (Test_2). In some embodiments, as elaborated in FIG. 3, the first short test 214 may be performed before the second long test 216. That is, testing conditions for the first short test may be confirmed before initiating the first short test, and after completion of the first short test, testing conditions for the second long test may be confirmed before initiating the second long test. In alternate examples, the two tests may be initiated simultaneously, or only one of the two tests may be performed based on engine operating conditions.

Short engine-off test 214 may be initiated upon confirming short test entry conditions 213. These may include confirming that the engine has been off for a first threshold duration t1 (e.g., longer than 360 seconds) and that Test_1 has not already been completed. The first threshold duration may be timed on a short test control timer. If entry conditions 213 are met, the short engine-off test 214 is initiated. As elaborated in FIG. 4, the test monitors fuel rail pressure and fuel tank pressure conditions and returns a result based on an absolute pressure differential between the two estimated pressures relative to a threshold (e.g., 12 psi). The result is saved as a parameter on the controller's KAM. In one example, the saved parameter may be either an indication that the short test was passed (e.g., via an indication or flag denoting "1"), that is, no fuel system leak was detected, if the differential is higher than the threshold. Alternatively, the saved parameter may indicate that the short test was failed (e.g., via an indication of flag denoting "−1"), that is, a gross leak in the fuel system was detected, if the differential is lower than the threshold. Upon completion of the short test 214, an appropriate "short test complete" flag may be set so that the short test is locked out until the next engine run-stop cycle. Additionally, after completing the short test, the engine system may resume normal testing state 206.

Upon completing short engine-off test 214 (or independent of short test 214), long engine-off test 216 may be initiated upon confirming long test entry conditions 215. These may include confirming that the engine has been off for a second threshold duration that is longer than the first threshold duration of the short engine test, and that Test_2 has not already been completed. The second threshold duration may be timed on a long test control timer. For example, it may be confirmed that the engine has been off for more than 6 hrs but less than 5 days. If entry conditions 215 are met, the long engine-off test 216 is initiated. As elaborated in FIG. 5, the test monitors fuel rail pressure and fuel tank pressure conditions and returns a result based on a comparison between the estimated fuel rail pressure relative to a barometric pressure. The result is saved as a parameter on the controller's KAM. In one example, the saved parameter may be either an indication that the long test was passed (e.g., via an indication or flag denoting "1"), that is, no fuel system leak was detected, if the fuel rail pressure is higher than the barometric pressure by a threshold amount. Alternatively, the saved parameter may indicate that the long test was failed (e.g., via an indication of flag denoting "−1"), that is, a small leak in the fuel system was detected, if the fuel rail pressure is lower than the barometric pressure by a threshold amount. Upon completion of the long test 216, an appropriate "long test complete" flag may be set so that the long test is locked out until the next engine run-stop cycle. Additionally, after completing the long test, the engine system may resume normal testing state 206.

Returning to initial testing state 204, the engine system may alternatively transition from initial testing state 204 to a testing shutdown state 208 (LPG_PRS_TST_SHUTDOWN) if entry conditions 209 have been met. Entry conditions 209 may include confirming that the engine has been started and it is running. In the testing shutdown state, the engine conditions are monitored to determine if the engine-off tests should run when the engine is next stopped. Additionally, when the system is in testing shutdown state 208, all the previous test state variables may be cleared out from the KAM, namely the test complete flags and the test control timer readings. In particular, while in testing shutdown state 208, the system may continually perform evaluation 212 wherein engine conditions during running and for a short duration after engine stop are evaluated. The system may unconditionally loop between testing shutdown state 208 and evaluation 212 on each loop of the code upon entering shutdown state 208. That is, "engine running preconditions" may be monitored and stored in the controller, and if the conditions are met, a flag indicating that "engine running preconditions have been met" may be set. As such, this flag may be used to determine if entry conditions 205 have been met for transitioning between initial testing state 204 and normal testing state 206. Engine running preconditions may be considered met at evaluation 212 if each of the cylinder head temperature is within a defined range (e.g., between 180° F. and 240° F.), the manifold charge temperature is within a defined range (e.g., between 20° F. and 150° F.), the engine oil temperature is within a defined range (e.g., between 100° F. and 240° F.), a temperature differential between the fuel rail temperature and the fuel tank temperature is less than a threshold (e.g., less than 40° F.), and the engine is not running in a fail-safe cooling mode. As such, the fail safe cooling mode may refer to a failure mode wherein coolant may have leaked from the engine. In this state, the engine and under-hood temperatures may be such that the integrity tests may not be run reliably. It will be appreciated that alternate engine-running leak tests may be optionally performed while the engine is running, such as Test_3 of FIG. 6.

The system may return from shutdown state 208 to initial testing state 204 if entry conditions 210 are met. These entry conditions may include confirming that the ignition has been switched off and that the engine has been stopped for a threshold duration (t4). In one example, it may be confirmed that the engine has been stopped for at least 60 seconds.

In this way, the engine system may transition between states to determine whether conditions have been met for accurately diagnosing the presence of a fuel system leak/breach while the engine is in a shutdown condition. By verifying fuel system integrity based on changes in fuel system pressures and temperatures over a duration of the engine shutdown, small leaks and gross leaks in the fuel system may be better identified and distinguished. As such, this may improve the accuracy of fuel system integrity diagnostics.

Figure 3:
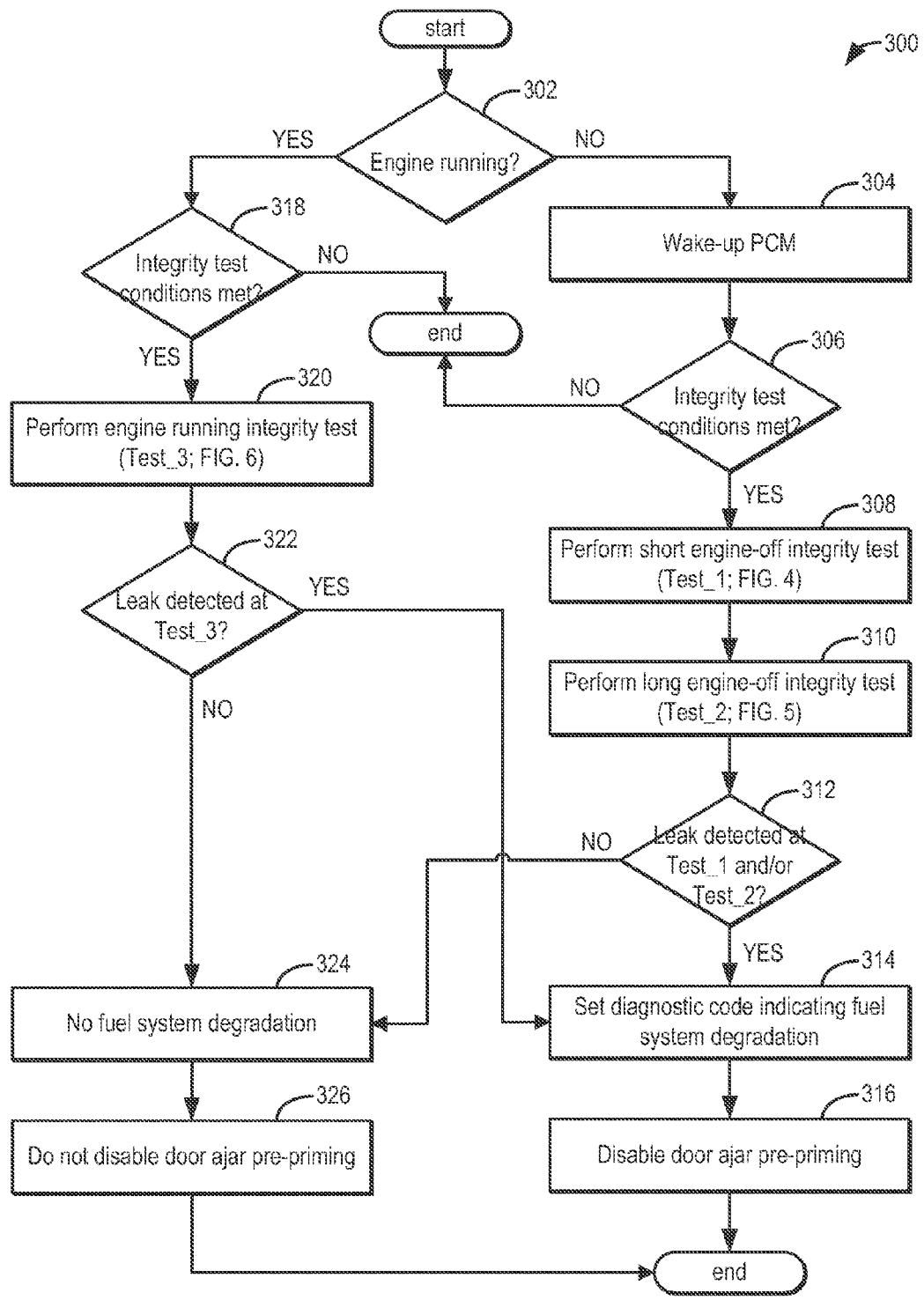
FIG. 3 shows an example flowchart for identifying fuel system leaks and adjusting a priming operation responsive to the identification of a leak.

Now turning to FIG. 3, an example routine 300 is shown for diagnosing the fuel integrity of an engine fuel system configured to deliver a gaseous fuel. In one example, the gaseous fuel is an LPG fuel. As such, one or more fuel integrity tests may be performed while the engine is running and/or while the engine is shutdown. In response to an indication of fuel system degradation based on diagnostics performed during engine shutdown conditions, a priming or pre-priming operation may be adjusted during a subsequent engine restart, the adjustment based on the indication. In this way, sufficient fuel rail priming during an engine restart may be better enabled.

At 302, the routine includes determining if the engine is running. As such, diagnostic routines performed while the engine is running may vary from those performed while the engine is shutdown. Herein, by assessing fuel system integrity during each of engine running and engine shutdown conditions, fuel system integrity may be more reliably determined. If the engine is not running, then at 304, the routine includes enabling an electronic controller for a duration. In one example, as elaborated with reference to the state diagram of FIG. 2, a PCM of the controller may be enabled or awoken after a threshold duration since the engine shutdown has elapsed. Alternatively, the PCM may be enabled or awoken immediately after the engine has been shutdown and maintained awake for at least a duration to enable the leak diagnostics to be performed. After the leak diagnostics are completed, and if no engine restart indication is received from a vehicle operator, the PCM may be disabled, or shifted to a sleep mode.

After enabling the electronic controller, the routine includes, at 306, confirming that integrity test conditions have been met. As elaborated with reference to the state diagram of FIG. 2, this may include confirming that "engine running pre-conditions" have been confirmed and further that the engine has been shut down for at least a threshold duration (e.g., at least 360 seconds). In addition, it may be confirmed that leak diagnostic tests have not already been completed. As such, the engine running pre-conditions may be conditions that are monitored and confirmed during an engine drive cycle immediately preceding the engine shutdown condition. During that drive cycle, various engine operating parameters (e.g., cylinder head temperature, manifold charge temperature, engine oil temperature, fuel rail temperature, fuel tank temperature, engine operating mode, etc.) may be estimated, and if they are within the desired range, a flag indicating that "engine running preconditions have been met" may be set and stored in the controller's KAM. During the engine shutdown condition, the flag may be retrieved from the KAM and if it indicates that the fuel system integrity conditions have been met, the routine may proceed to perform the engine-off fuel integrity tests.

Figure 4:
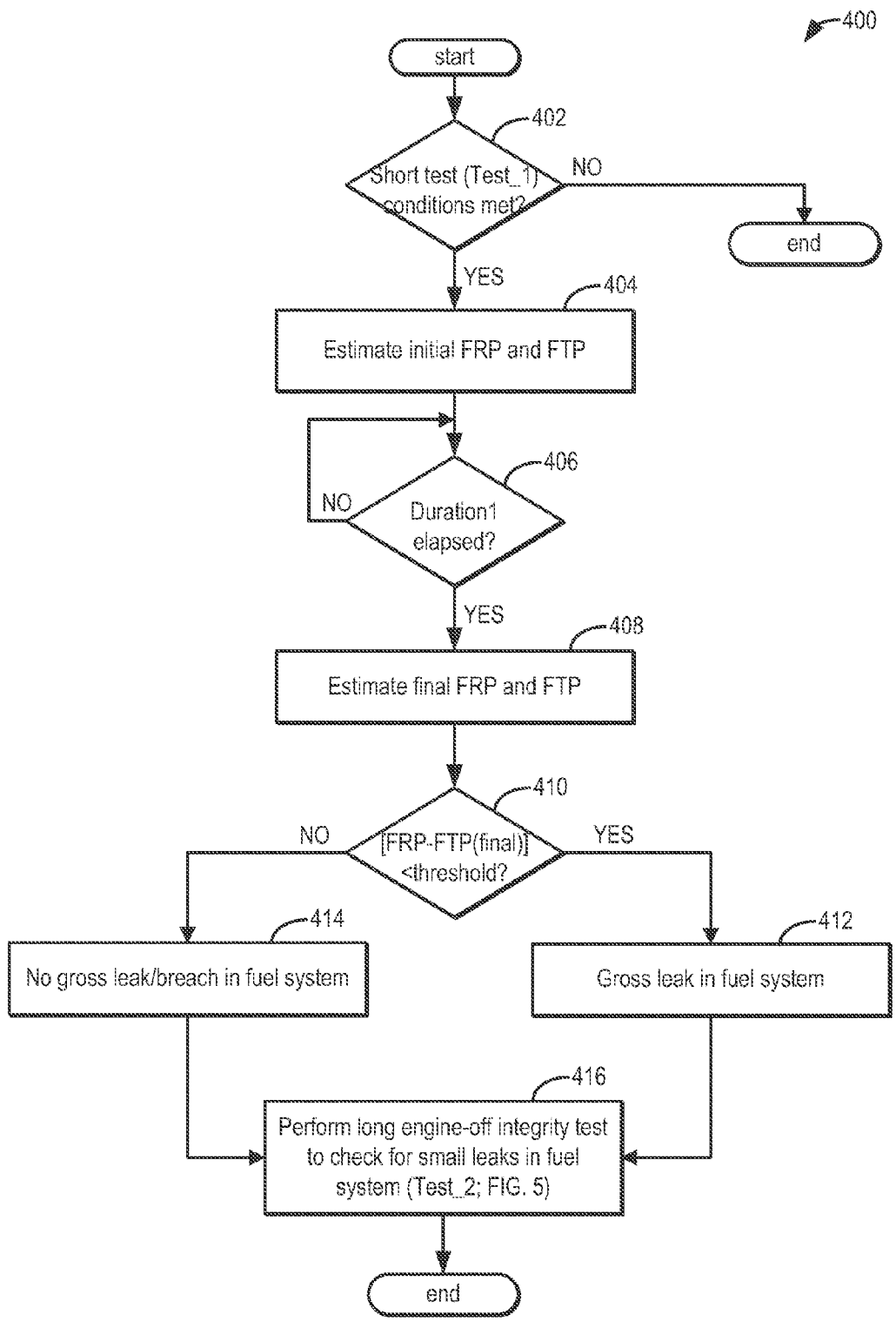
FIGS. 4-6 show example leak detection routines.

In particular, at 308, the routine may include performing a first, short engine-off fuel integrity test (Test_1) to identify the presence of gross or large leaks, as further elaborated with reference to FIG. 4. Then, at 310, the routine may include performing a second, long engine-off fuel integrity test (Test_2) to identify the presence of small leaks, as further elaborated with reference to FIG. 5. While the depicted routine shows the second test being performed only after the first test has been completed, in alternate embodiments, the order of the routines may differ, or both engine-off tests may be initiated concomitantly. In still other embodiments, only one of the tests may be performed, the selection based on engine operating conditions.

In one example, the electronic controller may be enabled or awoken for each of a first, shorter duration and a second, longer duration, the first short leak test performed while the electronic controller is enabled for the first duration, the second long leak test performed while the electronic controller is enabled for the second duration. As elaborated with reference to the routines of FIGS. 4-5, a first, gross leak in the fuel system may be indicated based on a difference between a fuel rail pressure and a fuel tank pressure being lower than a first threshold after the first duration while the second, small leak in the fuel system may be indicated based on a difference between the fuel rail pressure and barometric pressure being lower than a second threshold after the second duration.

At 312, it may be determined if a leak has been detected at either of the engine-off fuel integrity tests. If no, then at 324, no fuel system degradation may be indicated by setting an appropriate flag. Then, at 326, in response to an indication of no fuel system degradation, pre-priming of the fuel rail may not be disabled. That is, a "door ajar pre-priming" operation may be enabled. Therein, a fuel pump may be operated to prime the fuel rail when a vehicle operator door is opened before an operator restart request is received. That is, pre-priming may be enabled in response to a vehicle operator opening the door, and before the operator turns on the engine start button or turns an ignition key to indicate that they wish to restart the engine. By enabling the pre-priming when there is no fuel system degradation, sufficient fuel rail pressures may be attained by the time the vehicle operator restart request is received. As such, this may reduce engine restart times and improve engine startability with a gaseous fuel.

Returning to 312, if a leak is detected at either the first short leak test or the second long leak test, then at 314, fuel system degradation may be indicated by setting an appropriate flag or diagnostic code. Then, at 316, in response to the indication of fuel system degradation, the routine includes disabling the door ajar pre-priming operation. In one example, in place of the pre-priming, the controller may enable a priming operation to be performed only after a restart request has been received from the operator. Therein, the controller may operate the fuel pump to prime the fuel rail only after the vehicle operator's ignition on or restart request has been received, typically by use of a key or button In some embodiments, a duration of the pre-priming in response to the indication of no fuel system degradation may be shorter than a duration of the priming in response to the indication of fuel system degradation. Herein, by extending the duration of priming in response to the indication of fuel system degradation, sufficient fuel rail priming at the subsequent engine restart may be better enabled. Typically, if the pre-priming operation is not complete, a key-on priming (or crank request priming) may take a longer amount of time.

It will be appreciated that in some embodiments, during the engine shutdown, the controller may also be configured to update an estimated fuel composition of the gaseous fuel based on each of a fuel tank pressure, fuel tank temperature and fuel tank air content. For example, the fuel composition updating may be initiated in response to a fuel tank refill event that occurs during the engine shutdown condition. The fuel tank refill event may be indicated based on a change in fuel tank fuel level and/or a rate of change in fuel tank pressure that is monitored by the controller while the engine is shutdown. Then, on the subsequent engine restart, a duration of the priming and/or the pre-priming may be based on the updated fuel composition. In one example, where the gaseous fuel used in the fuel system is an LPG fuel, a duration of the priming or pre-priming operation may be increased as the propane to butane content in the updated composition of the LPG fuel increases.

Returning to 302, if the engine is running, then at 318, the routine confirms engine running fuel integrity test conditions. These may include, for example, confirming that the engine temperature is higher than 180° F. but lower than 240° F., the engine Oil temperature is higher than 20° F. and lower than 150° F., an engine manifold charge air temperature is above 100° F. and below 240° F., and a difference between the fuel rail temperature and the fuel tank temperature is less than 40° F. Once the engine is started an engine running fuel system integrity test (Test_3) may be initiated, as elaborated in FIG. 6.

Next at 322, it may be determined if a low pressure fault in the fuel system has been detected upon performing Test_3. If no, then at 324, no fuel system degradation may be indicated and at 326, pre-priming may be continued (that is, not disabled). In comparison, if a leak is detected, then at 314, fuel system degradation may be indicated and at 316, pre-priming may be disabled. In place of the pre-priming, an extended priming operation may be enabled only after the operator engine restart or ignition-on request has been received, as elaborated above.

Figure 5:
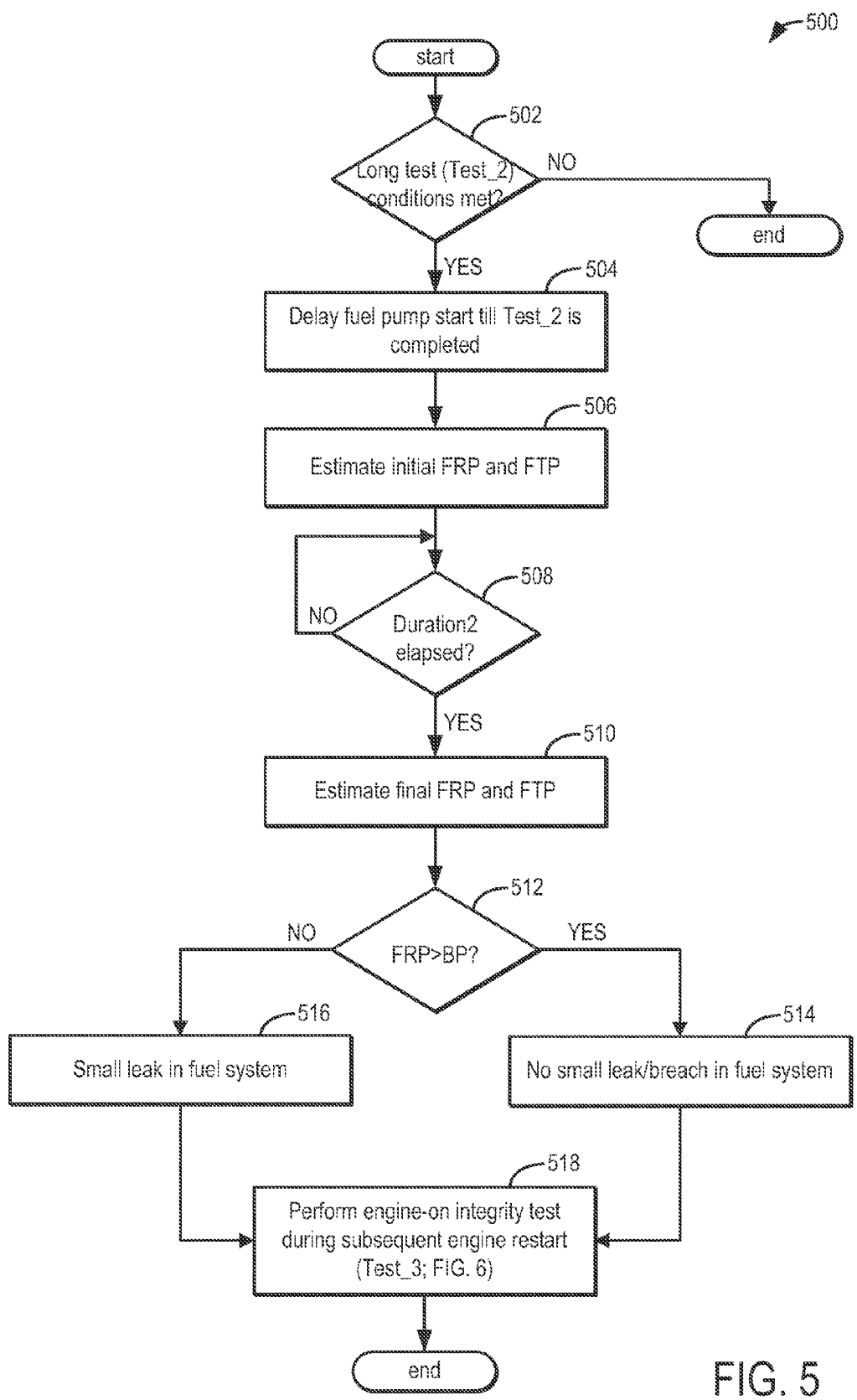

Now turning to FIGS. 4-5, routines 400 and 500 depict example engine-off fuel system integrity tests that may be performed on a fuel system configured to deliver a gaseous fuel, such as LPG. As such, the integrity tests of FIGS. 4-5 may be applied to fuels that are in the vapor/gaseous state as well as those in the liquid state at atmospheric pressure conditions. In particular, FIG. 4 describes a first, short test that may be performed to identify a gross leak in the fuel system while FIG. 5 describes a second, long test that may be performed to identify a small leak in the fuel system. In each case, fuel system degradation may be indicated based on a change in each of a fuel rail pressure and a fuel tank pressure over a duration while the engine is shutdown. As elaborated in FIG. 3 above, in response to the indication, pre-priming of a fuel rail may be disabled on a subsequent engine restart.

At routine 400 of FIG. 4, step 402 includes confirming that conditions for the first short test (Test_1) have been met. Upon confirmation, at 404, an initial fuel rail pressure and an initial fuel tank pressure may be estimated (e.g., via respective fuel tank and fuel rail pressure sensors or pressure transducers). As such, this estimate may reflect a fuel rail pressure and fuel tank pressure condition at the beginning of the short fuel integrity test. A short test control timer may also be initiated. At 406, it may be determined if a first threshold duration (d1) has elapsed. In one example, the threshold duration for the short fuel integrity test may be 360 sec. After the duration has elapsed, at 408, a final fuel rail pressure and a final fuel tank pressure may be estimated.

At 410, it may be determined if a pressure differential between the final fuel rail pressure and final fuel tank pressure is lower than a threshold (e.g., 0.85 Bar or 12 psi). In one example, an absolute pressure differential may be estimated. If the pressure differential is higher than the threshold (that is, the fuel rail pressure is sufficiently higher than the fuel tank pressure), then at 414, no gross leak or breach in the fuel system may be determined. That is, no fuel system degradation may be indicated. In comparison, if the pressure differential is lower than the threshold (that is, the fuel rail pressure is substantially lower than the fuel tank pressure), then at 412, a gross leak or breach in the fuel system may be determined. Specifically, a substantial loss in fuel rail pressure over a short duration of testing may indicate the presence of a gross leak. Accordingly, fuel system degradation may be indicated, for example, via a flag or diagnostic code.

It will be appreciated that while the depicted routine illustrates indicating a gross degradation in fuel system integrity based on a pressure differential between the fuel tank pressure and fuel rail pressure, in alternate embodiments, the indication may be based on a ratio of the fuel tank pressure and the fuel rail pressure. Still other functions may be possible.

Following the first, short fuel integrity test, from 412 and 414, the routine may proceed to 416 to perform the second long fuel integrity test to check for the presence of small leaks or breaches in the fuel system, as elaborated below in FIG. 5.

In this way, an electronic controller may be powered up over a first, shorter duration while the engine is shutdown to estimate each of a fuel rail pressure and a fuel tank pressure, and indicate fuel system degradation if a difference between the estimated fuel tank pressure and the fuel rail pressure is lower than a threshold after the first duration. Specifically, a first, gross leak in the fuel system may be determined based on a difference between the fuel rail pressure and the fuel tank pressure being lower than a first threshold after the first shorter duration while the engine is shutdown.

At routine 500 of FIG. 5, step 502 includes confirming that conditions for the second long test (Test_2) have been met. Upon confirmation, at 504, operation of the fuel pump may be delayed until the test is completed. Next, at 506, an initial fuel rail pressure and an initial fuel tank pressure may be estimated (e.g., via respective fuel tank and fuel rail pressure sensors or pressure transducers). A long test control timer may also be initiated. At 508, it may be determined if a second threshold duration (d2) has elapsed. As such, the first duration over which the parameters are monitored for the short fuel integrity test may be smaller than the second duration over which the parameters are monitored for the long fuel integrity test. In one example, the threshold duration for the long fuel integrity test may be between 6 hours and 5 days. After the threshold duration has elapsed, at 510, a final fuel rail pressure and a final fuel tank pressure may be estimated.

It will be appreciated that while the depicted embodiment shows the long integrity fuel test being run when the customer wakes up the vehicle PCM, in alternate embodiments, the long integrity fuel tests may be run automatically with a timer-based wake-up schedule if such a facility is included in the vehicle's hardware and/or software.

At 512, it may be determined if the final fuel rail pressure is higher than the barometric pressure, for example, by a threshold amount (e.g., 0.85 Bar, or 12 psi). If the fuel rail pressure is substantially higher than the barometric pressure, then at 516, no small leak or breach in the fuel system may be determined. That is, no fuel system degradation may be indicated. In comparison, if the fuel rail pressure has decreased over the duration and has finally approached the barometric pressure, then at 514, a small leak or breach in the fuel system may be determined. Specifically, a gradual loss in fuel rail pressure over a long duration of testing such that the fuel rail pressure gradually equilibrates at, or towards, the barometric pressure, may indicate the presence of a small leak. Accordingly, fuel system degradation may be indicated, for example, via a flag or diagnostic code.

In some embodiments, the final fuel rail pressure may be compared to each of the barometric pressure and a threshold pressure. The threshold pressure may be higher than the barometric pressure and may reflect a target minimum pressure that is desired at the fuel rail. Therein, no degradation of the fuel system (that is, no small leak) may be indicated in response to the final fuel rail pressure being higher than each of the barometric pressure and the target minimum pressure. However, fuel system degradation may be indicated in response to the final fuel rail pressure being above the barometric pressure but not above the target minimum pressure. An example of identifying fuel system degradation based on an engine-off long fuel integrity test (Test_2 of FIG. 5) and adjusting a door ajar pre-priming operation based on the indication is illustrated at FIG. 7.

It will be appreciated that while the depicted routine illustrates indicating a small degradation in fuel system integrity based on a pressure difference between the fuel rail pressure and atmospheric or barometric pressure, in alternate embodiments, the indication may be based on a ratio of the fuel rail pressure to the barometric pressure. Still other functions may be possible.

Following the second, long fuel integrity test, from 516 and 514, the routine may proceed to 518 to perform an engine-on fuel integrity test during a subsequent engine restart, as elaborated below in FIG. 6.

In this way, an electronic controller may be powered up over a second, longer duration while the engine is shutdown to estimate at least a fuel rail pressure (e.g., each of a fuel rail pressure and a fuel tank pressure), and indicate fuel system degradation based on a difference between the estimated fuel rail pressure and a barometric pressure. Specifically, a second, small leak in the fuel system may be determined based on a difference between the fuel rail pressure and barometric pressure being lower than a second threshold after the second longer duration while the engine is shutdown.

Figure 6:
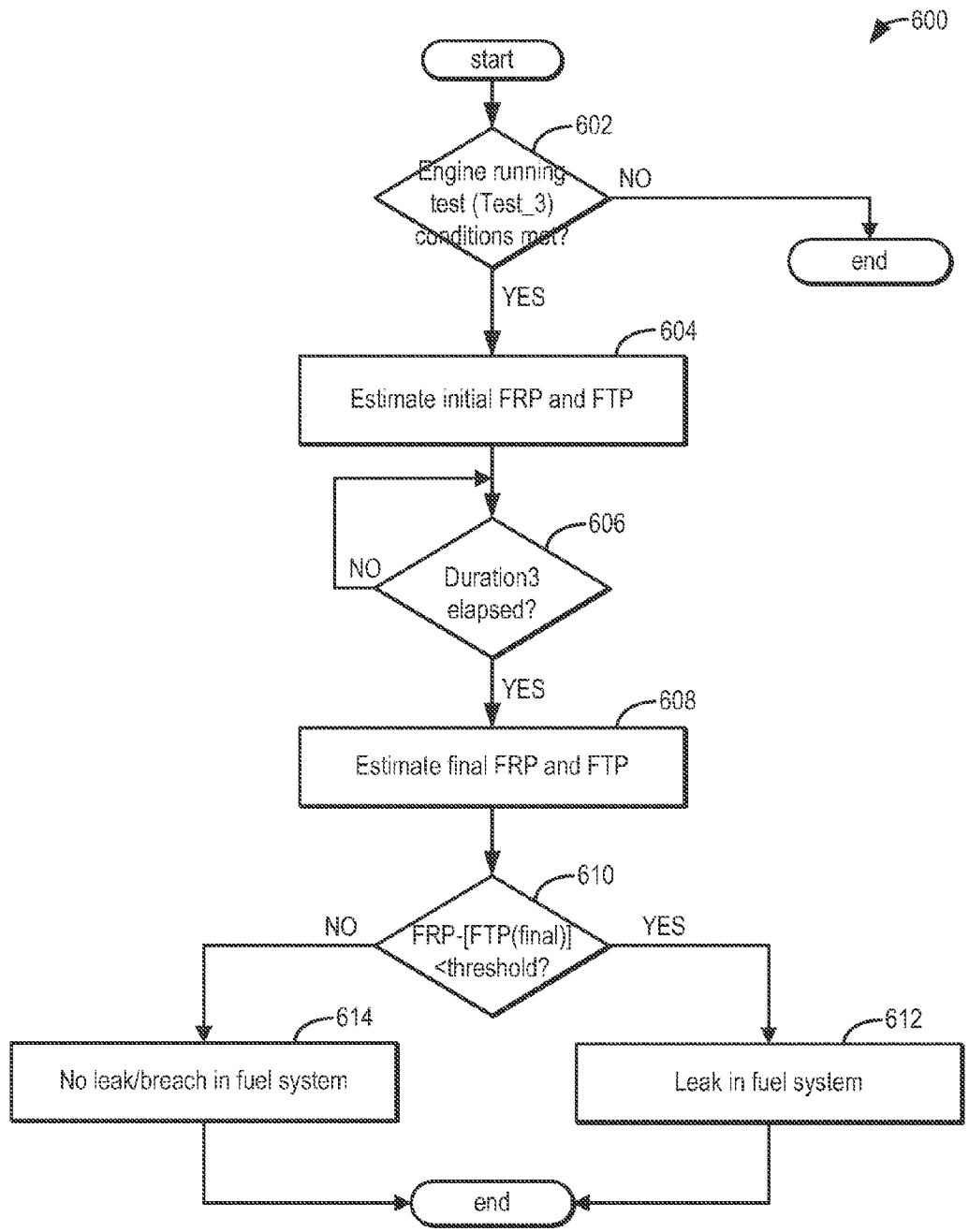
Figure 7:
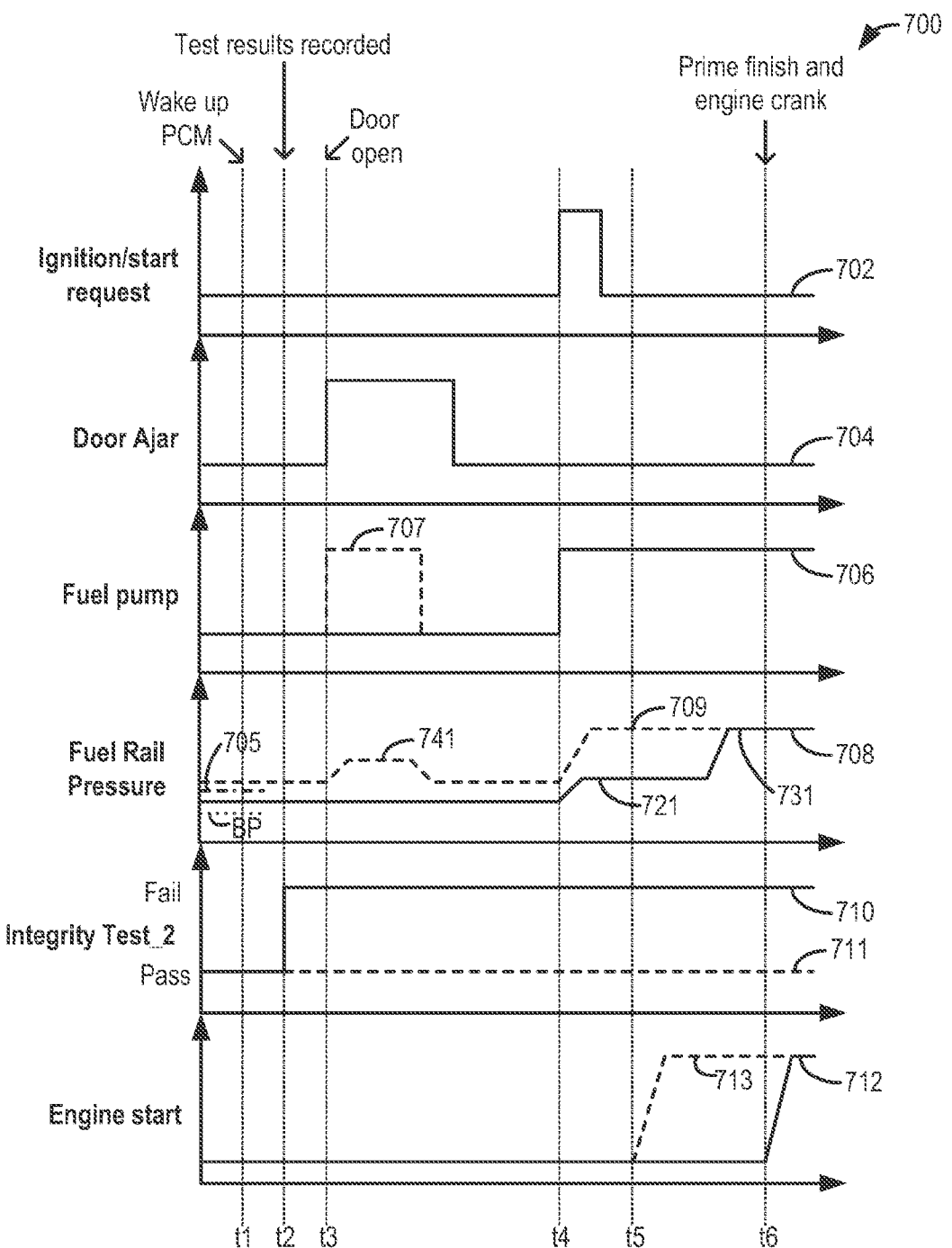
FIG. 7 shows an example adjustment to a priming operation responsive to an indication of a fuel system leak.

Now turning to FIG. 6, routine 600 depicts an example engine-on fuel system integrity test that may be performed on a fuel system configured to deliver a gaseous fuel, such as LPG, while the engine is running. In response to the indication, pre-priming of a fuel rail on a subsequent engine restart (e.g., the next drive cycle) may be adjusted.

At step 602, the routine includes confirming that conditions for the engine-running fuel system integrity test (Test_3) have been met. These may include engine running conditions such as a, fuel tank level being more than 15% full, the engine running, the engine running diagnostics having been enabled (e.g., at 4 sec after start), and no faults having been detected on the system pressure sensors (e.g., tank and rail pressure sensors). Upon confirmation, at 604, an initial fuel rail pressure and an initial fuel tank pressure may be estimated (e.g., via respective fuel tank and fuel rail pressure sensors or pressure transducers). As such, this estimate may reflect a fuel rail pressure and fuel tank pressure condition at the beginning of the engine-running fuel system integrity test. An engine-on test control timer may also be initiated. At 606, it may be determined if a third threshold duration (d3) has elapsed. In one example, the threshold duration for the engine-running fuel integrity test may be 8 sec. After the duration has elapsed, at 608, a final fuel rail pressure and a final fuel tank pressure may be estimated.

At 610, it may be determined if a pressure differential between the final fuel rail pressure and final fuel tank pressure is lower than a threshold (e.g., 50 psi or 3.5 bar). In one example, an absolute pressure differential may be estimated. If the pressure differential is higher than the threshold (that is, the fuel rail pressure is sufficiently higher than the fuel tank pressure), then at 614, no leak or breach in the fuel system may be determined. That is, no fuel system degradation may be indicated. In comparison, if the pressure differential is lower than the threshold (that is, the fuel rail pressure is substantially lower than the fuel tank pressure), then at 612, a leak, faulty valve, faulty regulator, or breach in the fuel system may be determined. Specifically, a substantial loss in fuel rail pressure while the engine is running may indicate the presence of a leak. Accordingly, fuel system degradation may be indicated, for example, via a flag or diagnostic code.

It will be appreciated that while the depicted routine illustrates indicating degradation in fuel system integrity based on a pressure differential between the fuel tank pressure and fuel rail pressure, in alternate embodiments, the indication may be based on a ratio of the fuel tank pressure and the fuel rail pressure. Still other functions may be possible.

In this way, by determining fuel system degradation based on changes in fuel tank pressure and fuel rail pressure while the engine is shutdown, both small and gross leaks in the fuel system may be accurately and reliably determined. In addition, more secure operation of the system is enabled and actions can be taken to allow the system to continue to operate only after a manual intervention by the vehicle operator has been requested. In this way a user may choose to continue to operate the system that would otherwise be rendered into a degraded operational state. By further verifying fuel system degradation based on changes in fuel tank pressure and fuel rail pressure while the engine is running, leaks, valve faults and/or regulator faults that may arise during engine running conditions may be reliably identified.

An example adjustment to a pre-priming operation during an engine start based on an indication of fuel system degradation is shown at FIG. 7. Map 700 compares enablement of a door ajar pre-priming operation before an engine restart in response to an indication of no fuel system degradation (dashed lines) to a disablement of the door ajar pre-priming operation before an engine restart in response to an indication of fuel system degradation (solid lines). In particular, map 700 shows an indication regarding an ignition restart request at graph 702, an indication regarding a door ajar condition at graph 704, an indication regarding fuel pump operation at graphs 706 and 707, changes in fuel rail pressure at graphs 708 and 709, an indication regarding the results of a long engine-off fuel integrity test (such as Test_2 of FIG. 5) at graphs 710 and 711, and an indication regarding an engine restart at graphs 712 and 713.

In the depicted example, an engine-off fuel integrity test may have been performed before t2 after PCM wake up at t1. In one example, the long engine-off fuel integrity test (Test_2) previously elaborated at FIG. 5 may have been performed. Graph 710 (solid line) shows a first result of the fuel integrity test wherein a failed fuel integrity test may have been determined in response to the sensed fuel rail pressure (graph 708, solid line) being lower than a minimum target pressure 705. Herein, fuel system degradation may have been determined in response to the estimated fuel rail pressure (FRP) being higher than the barometric pressure (BP) but the difference between the estimated pressure and the BP not being sufficiently large, and consequently, the FRP remaining below the target (or threshold) minimum pressure 705. Consequently, at t2, a fuel integrity test failed indication (graph 710, solid line) is recorded at the PCM. In one example, the PCM may have been awoken due to the vehicle door being unlocked by a key fob at t1.

At t3, a driver door sensor may provide a driver door ajar indication (graph 704). However, since a fuel system degradation indication was previously recorded at the PCM, a door ajar pre-priming operation may have been disabled. As a result, even though the door ajar indication is received at t3, a fuel pump is not operated at t3 to initiate pre-priming of the fuel line.

At t4, a start request is received from the vehicle operator. For example, a restart request may be inferred due to the vehicle operator inserting a key to turn on the ignition. In response to the explicit ignition/restart request, at t4, the fuel pump is run (graph 706, solid line). Accordingly, the fuel rail pressure is gradually increased (graph 708, solid line) to a first bypass priming level 721, and then further increases to a second, higher priming level 731. Then, after the fuel rail pressure has reached and remained at the priming pressure for a duration, the engine is restarted at t6. In this way, pre-priming is disabled in response to the indication of degradation of the fuel system, and an engine restart is delayed (to t6) until sufficient priming of the fuel rail has been ensured.

In comparison, graph 711 (dashed line) shows a second, alternate result of the fuel integrity test wherein a passed fuel integrity test may have been determined in response to the sensed fuel rail pressure (graph 709, dashed line) being higher than each of the minimum target pressure 705 and the barometric pressure. Consequently, at t1, when the PCM is awoken (that is, PCM is in an "alive" state), a fuel integrity test passed indication (graph 711, dashed line) is recorded at t2 by the PCM. At t3, a driver door sensor provides a driver door ajar indication (graph 704). Herein, at t3, a door ajar pre-priming operation may be enabled since an indication of no fuel system degradation was previously recorded at the PCM. Specifically, at t3, in response to the door ajar indication, the fuel pump is operated (graph 707, dashed line) to initiate pre-priming of the fuel line.

As a result of the door ajar pre-priming being enabled, and the fuel pump being operated at t3, the fuel rail pressure is increased (graph 709, dashed line) to a pre-priming level 741. The elevated fuel rail pressure enables fuel rail pre-priming wherein fuel vapors remaining in the fuel rail (from a previous engine operation) are purged. The pre-priming operation is performed for a duration, allowing the engine to be ready to be started as soon as a restart request is received. At t4, the engine restart request is received (graph 702). Since pre-priming has already been performed, the indication of restart request may trigger operation of the fuel pump (to quickly raise the fuel rail pressure to the priming level 713) and also trigger restarting of the engine at t5. In this way, a door ajar pre-priming is enabled in response to the indication of no degradation of the fuel system, and an engine restart is enabled (at t5) soon after the engine restart request is received. As such, this improves engine restart times.

In this way, by performing fuel system integrity tests while an engine is shutdown, both small and gross leaks in a fuel system may be accurately and reliably determined. In addition, the identification of the leaks can be corroborated by leak tests performed during engine running conditions. By disabling pre-priming of the fuel system during an engine restart, based on the indication of degradation on the preceding engine shutdown, insufficient priming of the fuel rail during the restart can be reduced. By adjusting a duration of fuel rail priming based on an indication of fuel system leak or breach, sufficient priming of the fuel rail may be achieved, improving engine startability with gaseous fuels. Overall, engine performance may be improved, and engine stalls due to inaccurate fuel rail priming may be reduced.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine operating on a gaseous fuel, comprising:
   indicating fuel system degradation based on a change in each of a fuel rail pressure and a fuel tank pressure over a duration while the engine is shutdown, including if a difference between the fuel tank pressure and the fuel rail pressure is lower than a threshold after the duration; and
   in response to the indication, disabling pre-priming on a subsequent engine restart.

2. The method of claim 1, wherein an electronic controller is powered up over the duration while the engine is shutdown to estimate each of the fuel rail pressure and the fuel tank pressure.

3. The method of claim 1, wherein the gaseous fuel is a fuel that is in gaseous form at atmospheric conditions.

4. The method of claim 1, wherein the indicating includes, indicating a first, gross leak in the fuel system based on a difference between the fuel rail pressure and the fuel tank pressure being lower than a first threshold after a first shorter duration while the engine is shutdown; and indicating a second, small leak in the fuel system based on a difference between the fuel rail pressure and barometric pressure being lower than a second threshold after a second longer duration while the engine is shutdown.

5. A method for an engine operating on a gaseous fuel, comprising:
during a first engine restart, pre-priming a fuel rail by a controller operating a fuel pump before engine cranking in response to opening of a vehicle operator door; and
during a second engine restart, the controller disabling the pre-priming in response to an indication of fuel system degradation.

6. The method of claim 5, wherein the indication of fuel system degradation is received during an engine shutdown condition immediately preceding the second engine start.

7. The method of claim 6, wherein the indication of fuel system degradation is based on a change in one or more of a fuel rail pressure and a fuel tank pressure during the engine shutdown condition.

8. The method of claim 5, wherein during the first engine restart, a duration of the pre-priming is based on an estimated fuel composition of the gaseous fuel.

9. The method of claim 8, wherein the fuel composition is estimated during an engine shutdown condition immediately preceding the first engine restart, the fuel composition estimated based on each of a fuel tank pressure, a fuel tank temperature, and a fuel tank air content.

10. The method of claim 8, wherein the gaseous fuel is an LPG fuel, and wherein the duration of the pre-priming based on the estimated fuel composition includes increasing the pre-priming duration as a propane to butane content of the LPG fuel increases.

11. The method of claim 5, wherein the pre-priming includes operating a fuel pump to prime the fuel rail before cranking the engine.

12. A method of operating a fuel system delivering a gaseous fuel to an engine, comprising:
during an engine shutdown,
enabling an electronic controller for a duration; and
indicating fuel system degradation based on a change in one or more of a fuel tank temperature and pressure over the duration;
during a subsequent engine restart,
priming a fuel rail based on the indication;
during the engine shutdown or engine operation, updating an estimated fuel composition based on each of a fuel tank pressure, fuel tank temperature and fuel tank air content.

13. The method of claim 12, wherein enabling the electronic controller includes enabling the electronic controller for each of a first, shorter duration and a second, longer duration, and wherein the indicating includes, indicating a first, gross leak in the fuel system based on a difference between a fuel rail pressure and the fuel tank pressure being lower than a first threshold after the first duration and indicating a second, small leak in the fuel system based on a difference between the fuel rail pressure and barometric pressure being lower than a second threshold after the second duration.

14. The method of claim 12, wherein priming the fuel rail based on the indication includes,
in response to an indication of no fuel system degradation, pre-priming the fuel rail, the pre-priming including operating a fuel pump to prime the fuel rail when a vehicle operator door is opened before an operator restart request is received; and
in response to an indication of fuel system degradation, disabling the pre-priming and operating the fuel pump to prime the fuel rail after a vehicle operator restart request or ignition-on request is received.

15. The method of claim 14, wherein a duration of the pre-priming in response to the indication of no fuel system degradation is shorter than a duration of the priming in response to the indication of fuel system degradation.

16. The method of claim 12, wherein the updating is in response to a fuel tank refill event during the engine shutdown condition.

17. The method of claim 16, wherein the fuel tank refill event is based on a change in fuel tank fuel level and/or a rate of change in fuel tank pressure.

18. The method of claim 12, wherein a duration of the priming and/or pre-priming is based on the updated fuel composition.

* * * * *